Figure 3:
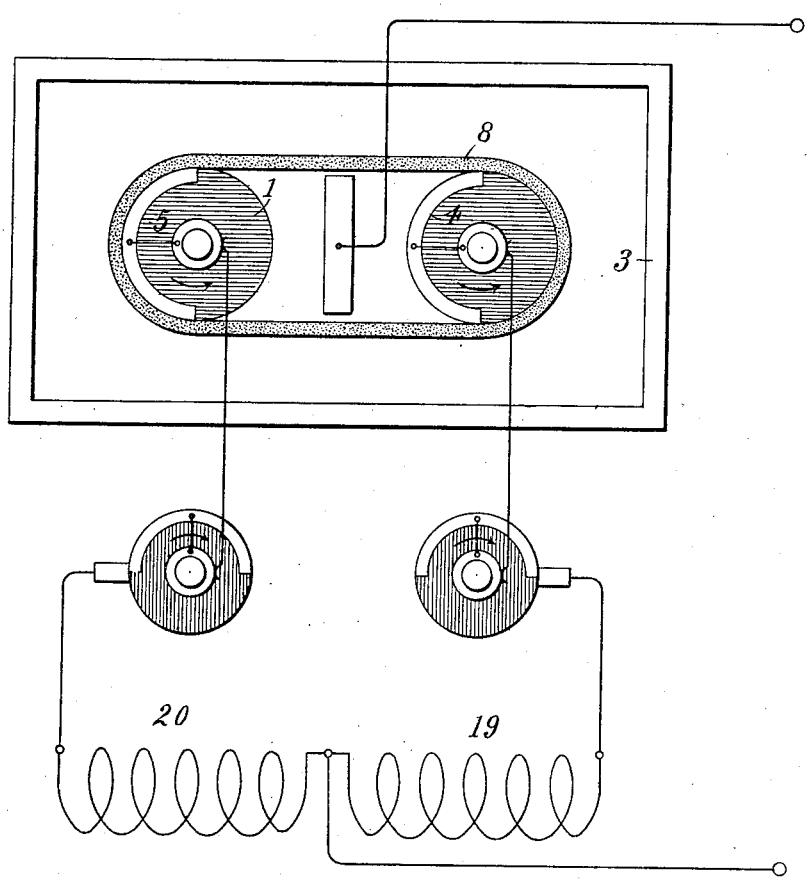

No. 734,424. PATENTED JULY 21, 1903.
F. H. LORING.
COMMUTATING AND CURRENT SHAPING DEVICE.
APPLICATION FILED MAR. 4, 1903.
NO MODEL. 7 SHEETS—SHEET 1.
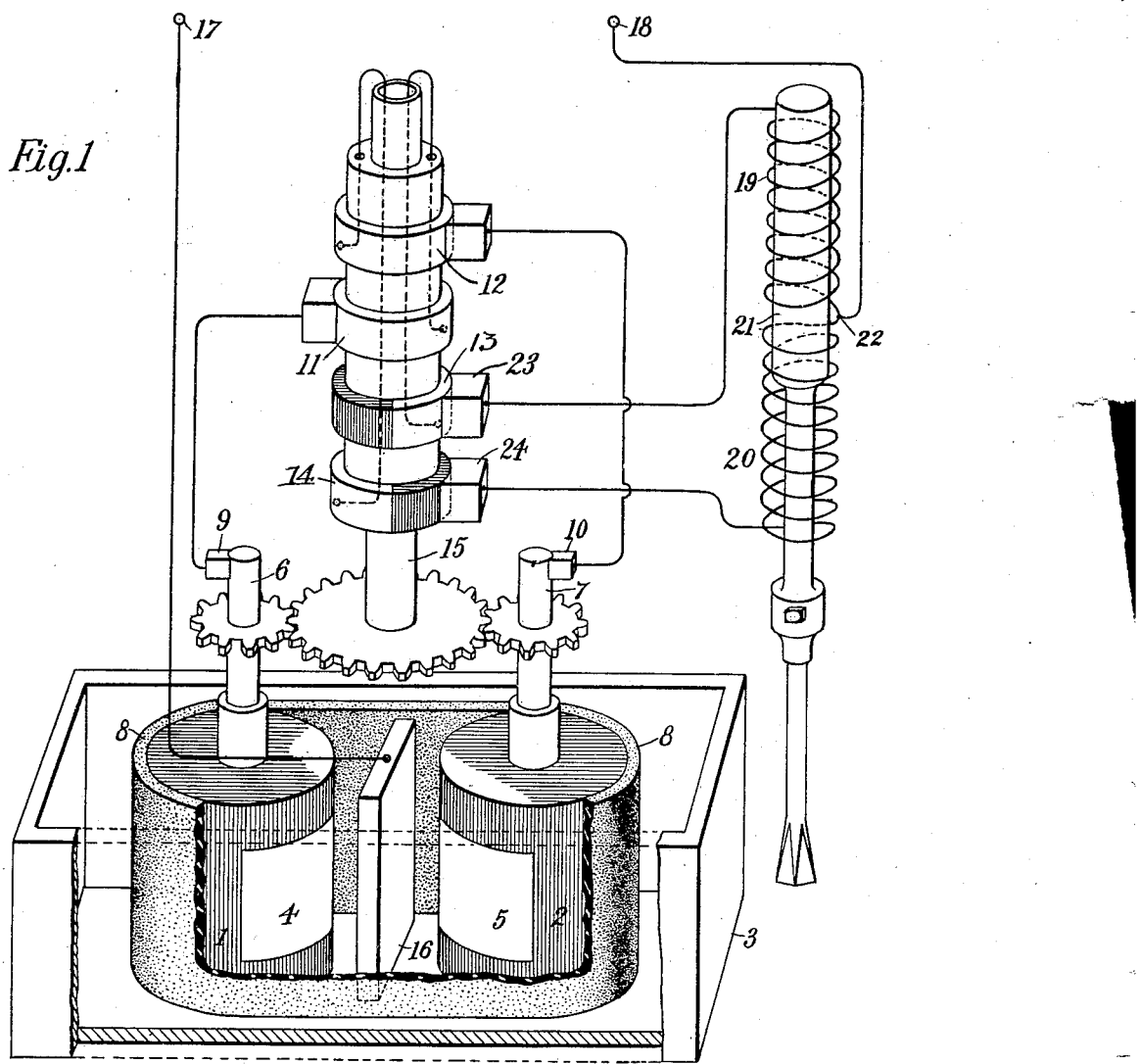
Fig.1
Fig.2
Witnesses:
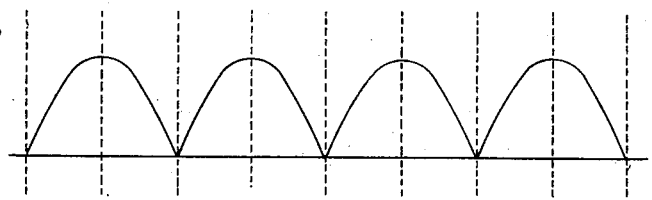
Frederick H. Loring Inventor
by Kerr, Page & Cooper, Att'ys No. 734,424.

PATENTED JULY 21, 1903.

F. H. LORING.

COMMUTATING AND CURRENT SHAPING DEVICE.

APPLICATION FILED MAR. 4, 1903.

NO MODEL.

7 SHEETS—SHEET 2.

Witnesses:

Frederick H. Loring,
Inventor by Kerr, Page & Cooper, Att'ys

No. 734,424. PATENTED JULY 21, 1903.
F. H. LORING.
COMMUTATING AND CURRENT SHAPING DEVICE.
APPLICATION FILED MAR. 4, 1903.
NO MODEL. 7 SHEETS—SHEET 3.

Witnesses: Frederick H. Loring, Inventor by Kerr, Page & Cooper, Att'ys

No. 734,424. PATENTED JULY 21, 1903.
F. H. LORING.
COMMUTATING AND CURRENT SHAPING DEVICE.
APPLICATION FILED MAR. 4, 1903.
NO MODEL. 7 SHEETS—SHEET 4.

Witnesses: Frederick H. Loring, Inventor

No. 734,424. PATENTED JULY 21, 1903.
F. H. LORING.
COMMUTATING AND CURRENT SHAPING DEVICE.
APPLICATION FILED MAR. 4, 1903.
NO MODEL. 7 SHEETS—SHEET 5.

Witnesses: Frederick H. Loring Inventor
A. D. Dunham
Thos. J. Byrnes by Kerr, Page & Cooper Attys No. 734,424. PATENTED JULY 21, 1903.
F. H. LORING.
COMMUTATING AND CURRENT SHAPING DEVICE.
APPLICATION FILED MAR. 4, 1903.
NO MODEL. 7 SHEETS—SHEET 6.

Witnesses: Frederick H. Loring, Inventor
A. S. Dunham
Thos. J. Byrnes
by Kerr, Page & Cooper, Att'ys No. 734,424. Patented July 21, 1903.

UNITED STATES PATENT OFFICE.

FREDERICK HENRY LORING, OF CHESTER, ENGLAND.

COMMUTATING AND CURRENT-SHAPING DEVICE.

SPECIFICATION forming part of Letters Patent No. 734,424, dated July 21, 1903.

Application filed March 4, 1903. Serial No. 146,134. (No model.)

*To all whom it may concern:*

Be it known that I, FREDERICK HENRY LORING, a citizen of the United States, residing at Chester, county of Chester, England, have invented certain new and useful Improvements in Commutating and Current-Shaping Devices, of which the following is a specification, reference being had to the drawings accompanying and forming part of the same.

The invention, subject of my present application, is an improvement in apparatus for converting by commutation a direct or continuous electric current into one or more intermittent, pulsating, or alternating currents suitable for the operation of reciprocating tools, alternating-current motors, and other devices. Many attempts have been made to accomplish these results, but so far as I am aware none of the devices heretofore proposed have proved satisfactory or even practicably operative, unless on a small scale, and when used with comparatively weak currents, for the reason that when a continuous current interlinked with and maintaining a strong magnetic flux is interrupted serious sparking occurs. This is due to the stored magnetic energy dissipating itself in a so-called "extra current," the energy of which is expended in breaking down the dielectric or in producing an arc of destructive nature between the separating points of contact. Moreover, the electromotive force of the source being in series with that of the extra current at the moment of break and in the same direction the resulting arc is longer and more destructive in consequence. It is therefore impracticable to commutate rapidly a continuous current into a succession of impulses or alternations for any of the many purposes for which such currents are desirable without reducing the value of the current to zero, or approximately so, at each instant of break. By my invention I provide an efficient and practicable means for effecting this reduction and interrupting or reversing the current during such periods of minimum value.

By the application of the principle of my invention I am enabled by the use of suitable devices to convert a continuous current of any strength into an intermittent, pulsating, or alternating current and to direct such periodic currents into different circuits for producing localized magnetic fields or by the conjoint action of such fields to produce shifting poles or magnetic resultants suitable for the operating of various electromagnetic devices—as, for example, reciprocating drills, or other tools, rotary field-motors, and the like.

To these ends my invention consists in producing periodic or successive variations in the value of a current of any proper kind by means of a fluid resistance, varied by the correlated movement of one or more electrodes in conjunction with one or more insulating bodies, or by the gradual isolation of the electrodes by means of a suitable body moving in the insulating medium, and when so desired interrupting, reversing, or in general commutating the current at or near the instants of minimum value.

The invention may be carried out by apparatus of the most widely-varied character, as will be evident from a consideration of some of the special forms which I have devised and which are illustrated in the accompanying drawings.

Figure 4:
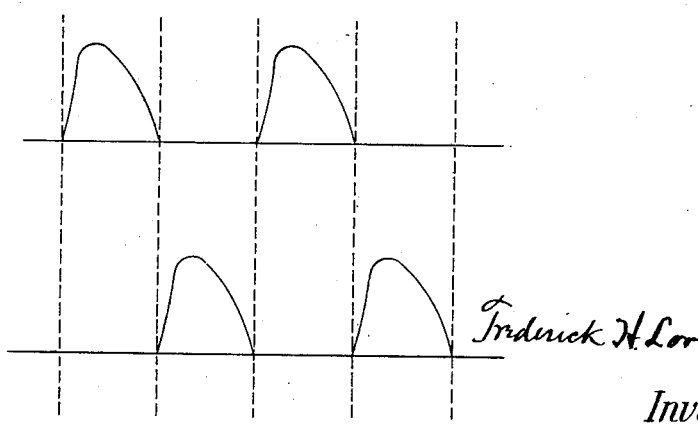
Figure 5:
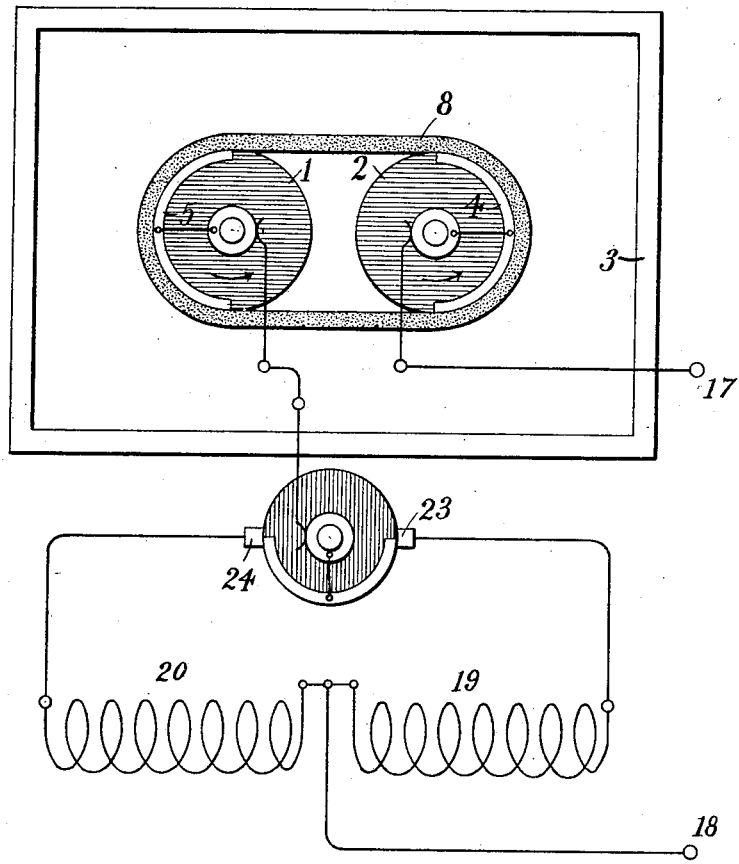
Figure 6:
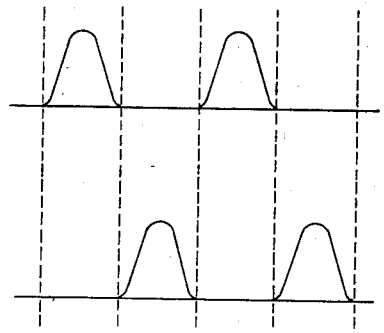
Figure 7:
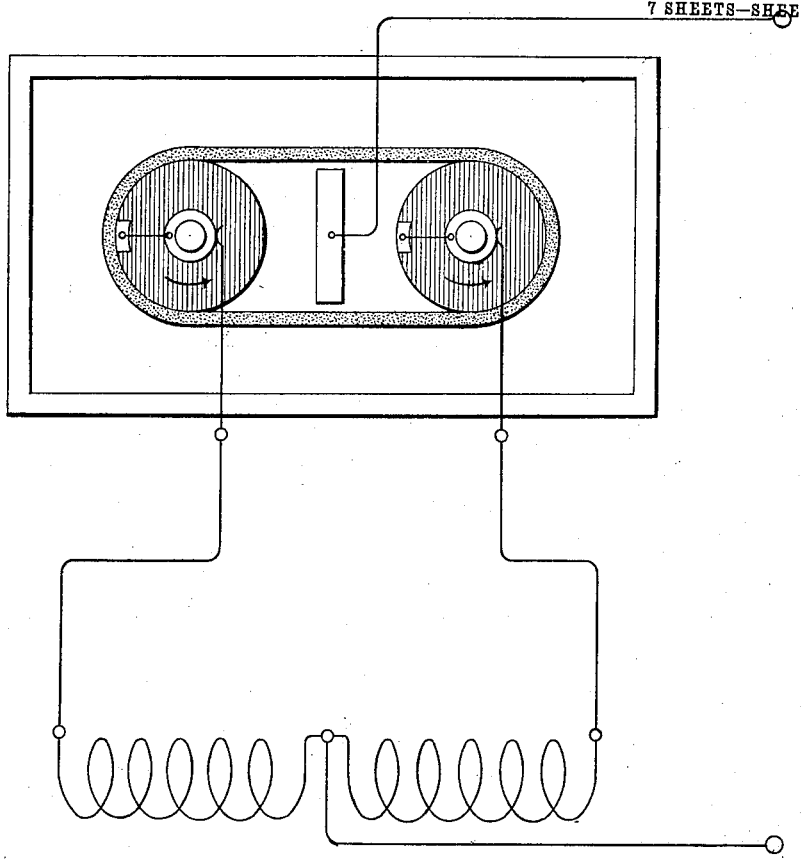
Figure 8:
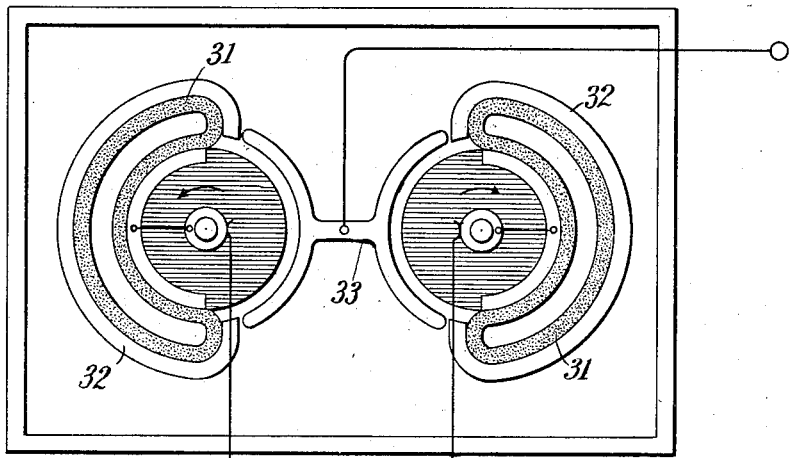
Figure 9:
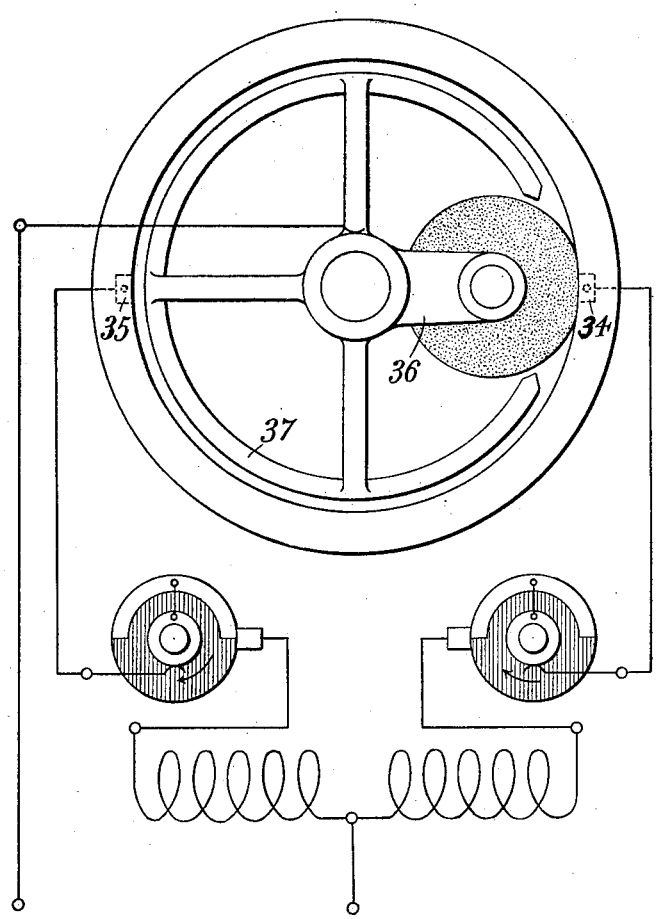
Figure 10:
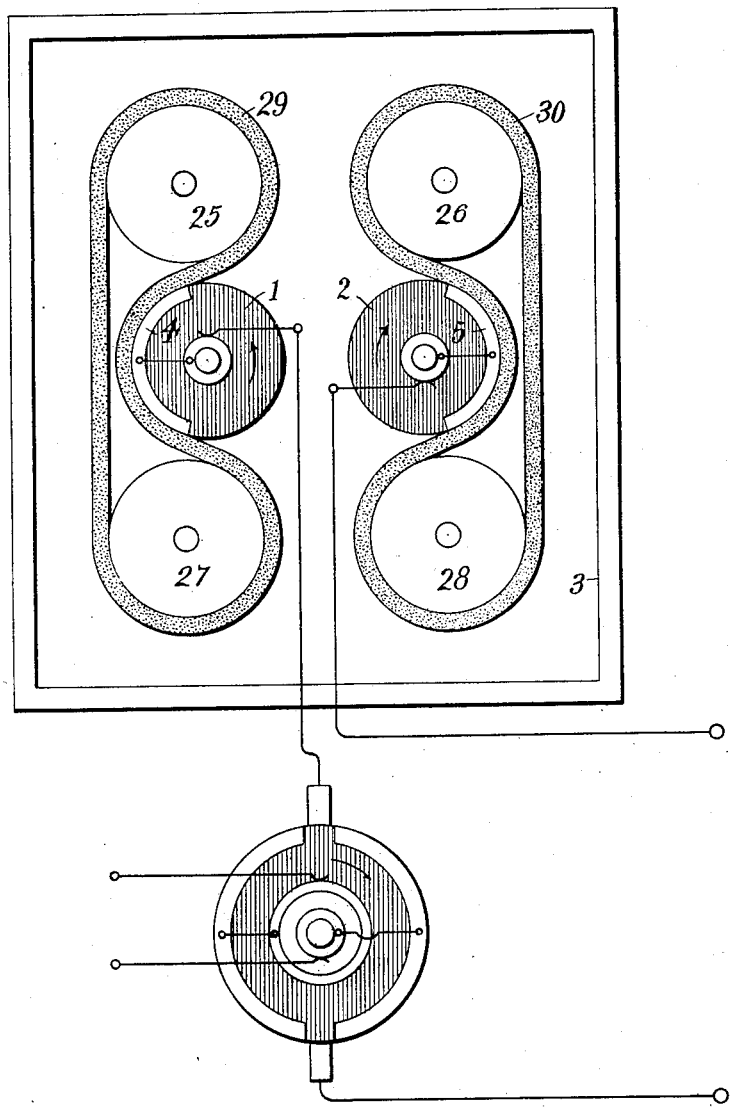
Figure 11:
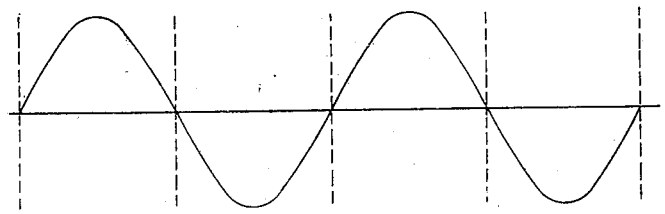
Figure 12:
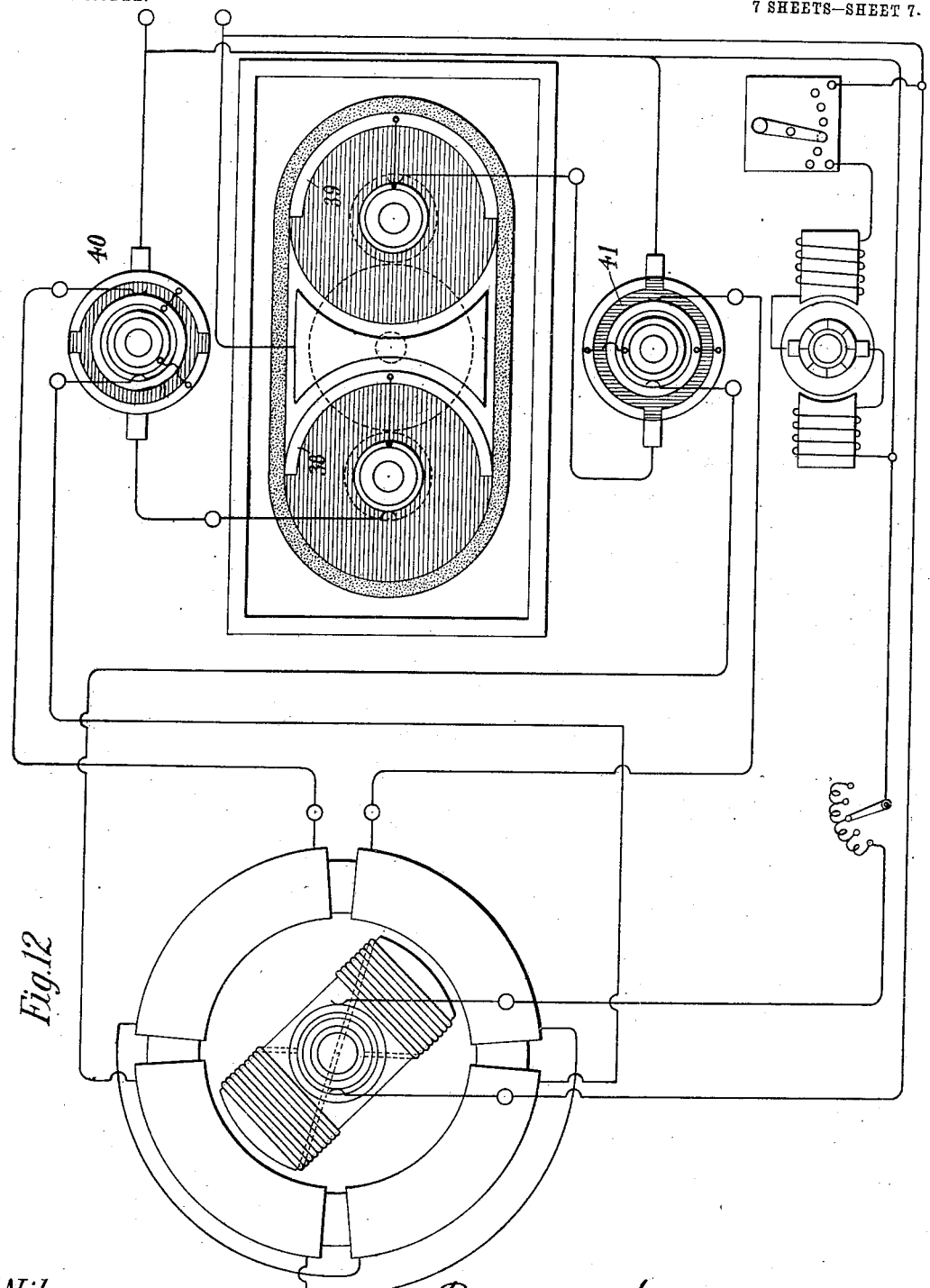

Figure 1 is a view, partly in diagram and partly in sectional perspective, of a simple embodiment of my improvement. Fig. 2 is a conventional diagram of the form of the current waves or impulses produced by the apparatus of Fig. 1. Fig. 3 is a diagrammatic illustration of a modified form of the apparatus. Fig. 4 is a diagram showing the shape or character of the current impulses or waves produced by the apparatus of Fig. 3. Fig. 5 shows another modification of the invention. Fig. 6 is a diagram of the wave form of the currents produced by the device of Fig. 5. Fig. 7 illustrates a form of the invention in which no commutator is employed. Fig. 8 is a view of a further modification. Fig. 9 is a view of a device embodying the invention, but containing stationary electrodes. Fig. 10 illustrates another modified form of the invention. Fig. 11 is a diagram of the wave form of the current produced by the apparatus of Fig. 10. Fig. 12 is a diagrammatic illustration of the means employed when applying the invention to the operation of alternating-current motors.

Referring for a general understanding of the invention to Fig. 1 of the accompanying drawings, 1 2 are drums of insulating material suitably journaled in a vessel 3, having embedded in their peripheral surfaces and flush therewith electrodes 4 5, preferably of lead or platinum, which are electrically connected with the shafts 6 7. A belt 8 of flexible insulating material, preferably soft rubber, is stretched over the drums, as shown, so that when the latter are rotated both electrodes 4 5 will for an instant during their rotation be completely covered by the belt. Their rotation may be effected by gearing, as shown, and they should move in absolute synchronism. Brushes 9 10 are arranged to bear on the drum-shafts and are connected with the collector-rings 11 12, which latter are connected with half-ring commutators 13 14, carried by a shaft 15, geared to revolve at half the speed of the drums. Between the drums is placed a stationary electrode 16, connected to one pole 17 of the continuous-current supply, while the other pole 18 is connected to the return circuit from the device in which the shaped or modified current is to be utilized. For convenience of illustration I have shown as a typical device of this kind a reciprocating drill having two oppositely-wound coils or solenoids 19 20, in which moves the plunger 21. The return-wire is connected to both the coils 19 20 at 22, the other terminals of said coils leading to brushes 23 24, bearing on the commutators 13 14. The vessel or tank 3 is filled with an electrolyte, which may be cooled artificially in any convenient manner, as by the circulation of air, water, or other cooling medium through pipes suitably arranged.

The operation of the apparatus will be readily understood. As the drums revolve the electrodes 4 5 are gradually covered and uncovered by the belt 8, thereby periodically varying the resistance of the circuit. The result is a shaping of the current, giving it a pulsating character, as illustrated in Fig. 2. These impulses or waves are directed by the commutators through brushes 23 24 into the coils 19 20 alternately, the commutation in each instance being effected at the instant of minimum current. Sparking is thus eliminated, and since the pulsations may be made to follow each other at different rates by varying the speed of the drums and shaft 15 the commutation may also be effected at any corresponding rate, thus controlling the operation of the drill or other device with great nicety. In detail, the course of the current is as follows: When the electrodes 4 5 are facing the stationary electrode 16, only one of them—for example, 4—is in connection with the drill-coils through the brush 9, collector 11, commutator 13, and brush 23. The current thus energizes the coil 19 only. As the drums revolve the current falls gradually to a minimum as the electrodes 4 5 are covered, at which time the conducting segment of commutator 14, set one hundred and eighty degrees in advance of that in the other, connects with the brush 24. The current now begins to rise to maximum again, this time through the electrode 5, brush 10, collector 12, commutator 14, brush 24, and the other coil 20. This operation is repeated at each revolution of the drums and commutators, so that the current flows through and energizes the coils alternately, the change of path being effected without sparking at the moment of zero or minimum current.

A modification of this arrangement is shown in Fig. 3, which will be understood from a very brief description, as corresponding parts are indicated by the same numerals as used in the foregoing figure. In this arrangement the electrodes 4 and 5 are located so as to be covered and uncovered alternately. Commutators are used in conjunction with the electrodes, as shown, for directing the impulses alternately through the two circuits of the device. The shape of the impulses delivered to the respective circuits will be approximately that indicated in Fig. 4. This results from the fact that the circuit is closed at the commutators when their corresponding electrodes are in or near the positions most favorable for the passage of current. Hence the pulsations or waves rise to maximum very rapidly, a condition which is often desirable in some forms of apparatus. The modification shown serves as an illustration of the manner in which the shape of the waves may be varied to almost any desired extent. In the device illustrated in this figure it will also be observed that the commutators and drums revolve at the same speed, thereby enabling me to obtain the same frequency of pulsations with lower linear velocity of the belt.

The employment of a stationary electrode in conjunction with the movable electrode or electrodes is not essential, as will be seen by reference to Fig. 5. In this arrangement the current from the source is led to one of the drum-shafts, as 7, and from the other shaft 6 to the shaft of a suitable commutator. By this means the current impulses will be delivered to the two drill or other circuits alternately, as before, the commutation occurring at the instants of minimum current. The shape of the impulses in this case will be approximately as shown in Fig. 6.

The above modifications are shown with commutators in connection therewith; but obviously the latter devices are not necessary adjuncts, as the same results may be accomplished by the shaping device alone. Fig. 7 represents the shaper arranged for this purpose. Here the electrodes are comparatively narrow, covering a shorter arc on the drums than in the former examples, while the shafts are connected directly to the coils 19 20. Consequently when one electrode is exposed and in circuit the other is covered, and therefore cut out, and the current is directed into the coils alternately.

Instead of one belt, as in the modifications described above, two separate belts may be employed. Fig. 10 shows such an embodiment of the invention, additional drums 25, 26, 27, and 28 being provided, over which work the belts 29 30. The electrode-carrying drums are journaled between the belt-drums and the belt, arranged as shown. Obviously the same effect will be produced as in the other forms. The commutator here illustrated gives an alternating current; nor is it necessary to employ a belt to cover rotating electrodes as the cutting out may be performed by other means—as, for example, a stationary pad of insulating material on which the electrode slides or by a moving body of insulating material in connection with stationary electrodes. A typical example of the first of these modifications is shown in Fig. 8, in which 31 31 are rubber pads, preferably hollow and inflatable, fitting the drums closely and provided with supporting-jackets 32 32, of porcelain or other suitable material. The stationary electrode of the special shape 33, here shown, is of course not limited to use in connection with this particular embodiment of my invention.

As an example of the forms wherein stationary electrodes are cut out by being covered by a moving body, I show in Fig. 9 electrodes 34 35, arranged on the inner wall of a circular vessel containing the electrolyte and a rotating roller mounted in arms 36, which swing around a central pivot. The roller, preferably of soft rubber, sweeps over the electrodes, and thus performs the same ultimate function as the moving belt. In this instance it is convenient to make the electrode, which is always exposed, corresponding to the part 16, Fig. 1, circular, as 37, and revolve it with the roller 36.

In operating reciprocating rock-drills the low frequency of current required—say seven per second—enables me to use advantageously such devices as illustrated, for example, by Figs. 1 and 3. For higher-frequency currents the device may take the form as typified by Figs. 9 and 10.

Referring to Fig. 10, the belts may be shielded in such a manner as to permit of a circulation of the liquid between the electrode-carrying drums, as indicated by the arrow. By this means the revolving electrodes cut in and out of a moving stream more or less in the direction of its flow, and obviously a greater speed of the electrodes may be obtained without the sacrifice of a uniform or homogeneous contact between the electrodes and the electrolyte.

In addition to the shaping of the stationary or moving electrodes for securing different wave forms I may effect practically the same thing by varying the angular velocity of the electrodes, by driving them by means of an elliptic or variable speed-gear, since by this means I am able to alter the time rate of change of the fluid resistance between the electrodes.

So far I have shown my invention in use with an electromagnetic device having a reciprocating plunger for its working part. It is clear, however, that the invention is adapted to a great variety of purposes, and as a further example of its applicability I show the same in Fig. 12 in connection with a rotary-field motor, with which motors my current-shaping device is especially useful.

In certain classes of work, more particularly in electric traction, it is highly desirable to start the motor gradually with a powerful torque, keeping its efficiency as high as possible. This result may be accomplished by my invention, as will appear from the following: The electrodes 38 39 are arranged, as in Fig. 12, to deliver pulsations or waves alternately, but by means of commutators 40 41 these waves are rendered alternating with any difference of phase, that in the arrangement illustrated being ninety degrees. The alternating current is then directed into the field-windings of the motor. Since the frequency and relative time positions of the phases of the alternations may be readily varied by varying, respectively, the speed and direction of rotation of the current-shaping devices, the speed and direction of rotation of the revolving magnetic field are correspondingly controlled, as will be readily understood. This variation or control is of great advantage in starting motors under load. In order that the starting of the motor may be effected without too great a loss of power, when it is desired to start with a very low or zero frequency and maximum impressed electromotive force excessive current may be prevented by introducing resistance in circuit with the stator-windings in the usual way. Another important feature of the system is the possibility of exciting the rotor-windings, as illustrated, by the continuous current, which is available for that purpose. The magnetizing-current in the stator may thereby be reduced, and by adjusting the exciting-current in the rotor the power factor may thus be brought to unity, or thereabout. Of course the usual closed-circuit windings may be used on the rotor, if desired. My invention, however, is not confined to use with two-phase motors, as just described, since it may be used with others as well. With a single-phase motor the armature can be brought up to speed by gradually increasing the frequency of the alternating current, as above described, while exciting its field from the continuous-current supply. This feature of separate excitation by continuous current which the system affords becomes a distinct advantage, since rectifiers, batteries, or motor-generators are not required as adjuncts to the motor.

Instead of using a pair of electrodes, as shown in Fig. 12, any number of them may be provided to produce polyphase currents, occupying different positions on one or two revolving drums, or a number of drums may be employed, each carrying one or more electrodes.

It is my purpose to cover by the present application the invention defined above as consisting in the means described for varying the value of a current by the variation of a fluid resistance between conducting-terminals immersed therein in such manner as to periodically reduce the current to such a value as to permit it to be interrupted or reversed without loss or injurious effects and also in the means or devices for interrupting, reversing, or in general controlling such a current.

The invention, as has been shown, has many useful applications, but these are described herein only so far as is necessary to a full understanding of the main invention, it being my purpose to make them the subject of other applications.

Having now described my invention, what I claim is—

1. An apparatus for shaping or modifying the form of an electric current, comprising in combination with a conducting fluid, electrodes, an insulating-body, immersed therein and adapted by their relative movements to periodically vary the area of electrode-surface exposed to the fluid and thereby vary the value of the current flowing between said electrodes, and independent means for interrupting or reversing the current through the fluid, as set forth.

2. The combination with a body of conducting fluid, of electrodes and an insulating-body adapted by their relative movements to periodically vary the area of electrode-surface exposed to the fluid, and commutating devices for interrupting or reversing the current from the electrodes at the instants of its minimum value, as set forth.

3. The combination with a body of conducting fluid, of two or more electrodes immersed therein, an insulating-body for exposing more or less electrode-surface to the fluid, by the relative movements of the said body and one or both electrodes, and commutating devices to which the current of varying value from the electrodes is led, and having a rate of movement which effects the interruption or reversal of the current at its instants of minimum value, as set forth.

4. The combination with a body of conducting fluid, of two or more electrodes having a portion of their surface immersed in and in contact with the fluid, an insulated body adapted by its relative movement to vary the area of electrode-surface in contact with the fluid, and a commutating device receiving current from the electrodes and adapted to interrupt or reverse the same at the instants of its minimum value, as set forth.

5. The combination with a body of conducting fluid, of rotary electrodes immersed therein, an insulating-body adapted by the rotation of the electrodes in contact therewith to vary the area of electrode-surface exposed to the fluid, and means for interrupting or reversing the current through the electrodes at the instants of its minimum value, as set forth.

6. The combination with a body of conducting fluid, of insulated rotary drums, electrodes carried thereby and having surfaces exposed to the fluid, a flexible insulating band or belt surrounding the drums and adapted by the rotation of said drums to vary the area of electrode-surface exposed to the fluid, and means for interrupting or reversing the current through the electrodes at the instants of its minimum value, as set forth.

7. The combination with a body of conducting fluid, of insulated synchronously-rotating drums, electrodes carried thereby and having surfaces exposed to the fluid, a flexible insulating band or belt surrounding the drums and adapted to vary the area of electrode-surface exposed to the fluid, and means for interrupting or reversing the current through the electrodes at the instants of its minimum value, as set forth.

8. The combination with a body of conducting fluid, of insulated synchronously-rotating drums, electrodes carried thereby and having surfaces exposed to the fluid, a flexible insulating band or belt surrounding the drums and adapted by the rotation of said drums to vary the area of electrode-surface exposed, a stationary electrode having surface exposed to the fluid, and means for interrupting or reversing the current through the electrodes at the instants of its minimum value, as set forth.

9. The combination with a body of conducting fluid, of insulated synchronously-rotating drums, a stationary electrode having surface exposed to the fluid and commutator devices for reversing the current at the instants of minimum value.

10. In a device of the kind described, the combination with rotating drums and electrodes on said drums, of a shaft geared to rotate with said drums, and commutating means on said shaft, as and for the purposes set forth.

11. In a device of the kind described, the combination with rotating drums and electrodes on said drums, of a shaft geared to rotate with said drums, collector devices and commutating means on said shaft, as and for the purposes set forth.

12. In a device of the kind described, the combination with means for periodically reducing the value of a current, of means for reversing the current at each instant of minimum reduction, as set forth.

13. In a device of the kind described, the combination with means for periodically reducing the value of a current at variable intervals, of means for reversing such current at each instant of minimum value, as set forth.

FREDERICK HENRY LORING.

Witnesses:
WM. PIERCE,
H. WATSON.